(12) United States Patent
Chen et al.

(10) Patent No.: US 12,468,082 B2
(45) Date of Patent: Nov. 11, 2025

(54) BACKLIGHT MODULE AND DISPLAY DEVICE

(71) Applicant: Radiant Opto-Electronics Corporation, Kaohsiung (TW)

(72) Inventors: Wei-Hsuan Chen, Kaohsiung (TW); Chun-Hau Lai, Kaohsiung (TW); Wen-Hao Cai, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/927,724

(22) Filed: Oct. 25, 2024

(65) Prior Publication Data

US 2025/0044495 A1 Feb. 6, 2025

Related U.S. Application Data

(63) Continuation of application No. PCT/CN2023/090823, filed on Apr. 6, 2023.

(30) Foreign Application Priority Data

Apr. 28, 2022 (CN) .......................... 202210460207.1

(51) Int. Cl.
*F21V 8/00* (2006.01)
*G02F 1/1335* (2006.01)

(52) U.S. Cl.
CPC ......... *G02B 6/0053* (2013.01); *G02B 6/0036* (2013.01); *G02F 1/133607* (2021.01)

(58) Field of Classification Search
CPC ............................. G02B 6/0053; G02B 5/045; G02B 2207/123; G02F 1/133607; G02F 1/133615; G02F 1/133603
See application file for complete search history.

(56) References Cited

U.S. PATENT DOCUMENTS

| | | | |
|---|---|---|---|
| 6,166,787 A | 12/2000 | Akins et al. | |
| 2009/0009688 A1 | 1/2009 | Koganezawa et al. | |
| 2020/0200961 A1 | 6/2020 | Watanabe et al. | |
| 2021/0397041 A1* | 12/2021 | Kashiwagi | G02F 1/133607 |
| 2023/0258977 A1* | 8/2023 | Ogawa | G02F 1/133607 |
| | | | 359/227 |

(Continued)

FOREIGN PATENT DOCUMENTS

| | | |
|---|---|---|
| CN | 1836178 A | 9/2006 |
| CN | 102879942 A | 1/2013 |
| CN | 103591547 A | 2/2014 |

(Continued)

*Primary Examiner* — Erin Kryukova

(57) ABSTRACT

A backlight module includes a light source, an optical film, and a light control film. The light control film has a first reference surface and a plurality of first optical structures disposed on the first reference surface. Each of the first optical structures has a first optical surface and a second optical surface. A first included angle is formed between the first optical surface and the first reference surface. A second included angle is formed between the second optical surface and the first reference surface. The first included angle is an acute angle and is smaller than the second included angle. Thereby, the light can be deflected to one side and the light output of the other side can be suppressed. This invention also provides a display device including the backlight module.

14 Claims, 16 Drawing Sheets

(56) References Cited

U.S. PATENT DOCUMENTS

2023/0273362 A1* 8/2023 Yagi .................... G02B 6/0075
362/606

FOREIGN PATENT DOCUMENTS

| | | | |
|---|---|---|---|
| CN | 102944951 B | | 11/2014 |
| CN | 111474624 A | | 7/2020 |
| CN | 111580308 A | | 8/2020 |
| CN | 112666752 A | * | 4/2021 |
| CN | 217386004 U | | 9/2022 |
| CN | 218064734 U | | 12/2022 |
| JP | 2001195913 A | | 7/2001 |
| KR | 20150034839 A | * | 4/2015 |
| TW | 200912474 A | | 3/2009 |
| TW | 202131073 A | | 8/2021 |
| WO | WO-2013145363 A1 | * | 10/2013 ............. G02B 5/045 |

\* cited by examiner

BACKLIGHT MODULE AND DISPLAY DEVICE

RELATED APPLICATIONS

This application is a continuation application of International Application No. PCT/CN2023/090823, filed on Apr. 26, 2023, which claims priority to China Application Serial Number 202210460207.1, filed on Apr. 28, 2022. The entire disclosures of all the above applications are hereby incorporated by reference.

FIELD OF THE INVENTION

The present invention relates to an optical element, particularly referring to a backlight module and display device capable of deflecting light field distributions.

BACKGROUND OF THE INVENTION

For automotive display devices, such as the Center Informative Display (CID), a wide viewing angle in horizontal is required to ensure that passengers on both the left and right sides can see the displayed content on the screen.

However, the backlight module used in the CID is difficult to apply to the display in front of the driver's seat (Driver Information Display, DID) or the display in front of the co-driver's seat (Co-Driver Display, CDD). The reason is that the wide-angle light of automotive display devices may be reflected by the car windows and affecting the driver. Therefore, conventional backlight module structures cannot meet the specific viewing angle requirements of automotive display devices.

SUMMARY OF THE INVENTION

One object of the present invention is to provide a backlight module capable of directing light field distributions towards one side.

The backlight module comprises a surface light source, an optical film, and a light control film. The optical film is disposed on an emitting side of the surface light source. The light control film comprises a first reference surface and multiple first optical structures positioned on the first reference surface, wherein the first reference surface is located on one side of the light control film facing away from the optical film. Each of said first optical structures comprises a first optical surface and a second optical surface, wherein the first optical surface and the second optical surface are arranged along a first direction. The first optical surface and the first reference surface form a first included angle $\theta_1$, the second optical surface and the first reference surface form a second included angle $\theta_2$, the first included angle $\theta_1$ is an acute angle, and the first included angle $\theta_1$ is smaller than the second included angle $\theta_2$.

In a preferable embodiment, the light emitted by the surface light source has an angular range of $\delta$ relative to the normal direction of the backlight module when passing through the optical film, the transmittance of the light is at least 50%, and the light deflects in the direction away from the first optical surface after entering the light control film.

In a preferable embodiment, the light deflects at an angle $\mu$ away from the first optical surface of the film when it exits the light control film, and the angle $\mu$ is determined by the following relationship: $\mu=0.52*\theta_1+29.7$.

In a preferable embodiment, the light emission angle $\delta$ of the optical film, the first included angle $\theta_1$ of the light control film, and the critical angle $\theta_c$ of the light control film satisfy the following relationship: $\delta+\theta_1<\theta_c$.

In a preferable embodiment, the optical film is a louver film with multiple blocking sections spaced along the first direction and multiple light-transmitting sections located between adjacent blocking sections. Each of the first optical structures extends along a second direction, where the first direction is not parallel to the second direction, and the blocking sections and the light-transmitting sections extend along the second direction.

In a preferable embodiment, the backlight module further includes a prism positioned between the surface light source and the optical film, and the prism has multiple linear microstructures extending along the first direction.

In a preferable embodiment, the backlight module further includes a prism positioned between the surface light source and the optical film, each of the first optical structures extends along a second direction, where the first direction is not parallel to the second direction, and the prism has multiple linear microstructures extending along the second direction.

In a preferable embodiment, the light control film further comprises a second reference surface relative to the first reference surface and multiple second optical structures arranged along the first direction on the second reference surface. Each of the first optical structures extends along a second direction, where the first direction is not parallel to the second direction. Each of the second optical structures extends along the second direction. Each of the second optical structures consists of a third optical surface and a fourth optical surface. The third optical surface and the second reference surface form a third included angle $\theta_3$, the fourth optical surface and the second reference surface form a fourth included angle $\theta_4$, and the third included angle $\theta_3$ is acute and smaller than the fourth included angle $\theta_4$.

In a preferable embodiment, the light emission angle $\delta$ of the optical film, the first included angle $\theta_1$ of the light control film, the third included angle $\theta_3$, and the critical angle $\theta_c$ of the light control film satisfy the following relationship: $\delta+(\theta_1+\theta_3)<\theta_c$.

In a preferable embodiment, the first included angle $\theta_1$ of the first optical structure and the third included angle $\theta_3$ of the second optical structure are oriented towards the same side of the light control film. Both the first included angle $\theta_1$ and the third included angle $\theta_3$ are less than 45 degrees, and both the second included angle $\theta_2$ and the fourth included angle $\theta_4$ are greater than 45 degrees.

In a preferable embodiment, the first included angle $\theta_1$ is greater than the third included angle $\theta_3$.

In a preferable embodiment, the surface light source comprises a light guide plate and a light bar. The light guide plate has a light incident side and a light exit side connected to the light incident side. The light bar is positioned on the light incident side of the light guide plate, and the light exit side faces the optical film.

In a preferable embodiment, the light bar comprises of a circuit board and multiple light-emitting elements, the circuit board extends along the first direction, and the light-emitting elements are arranged along the same direction.

In a preferable embodiment, the surface light source comprises a circuit board parallel to the optical film and multiple light-emitting elements positioned on the circuit board.

In a preferable embodiment, the surface light source further comprises a diffuser plate, which has a bottom surface and a top surface opposite to the bottom surface, the bottom surface faces the circuit board, and the top surface faces the optical film.

Another object of the present invention is to provide a display device which comprises the backlight module as described above, and a display panel arranged on the backlight module.

The characteristic of the present invention is that due to the asymmetrical nature of the first prism structure in the light control film, light passing through the film is deflected to one side by its asymmetrical microstructure, thereby suppressing the transmittance on the other side. As a result, when applied to displays such as the Driver Information Display (DID) or Co-Driver Display (CDD) positioned in front of the driver's or co-driver's seat, the light distribution can be biased to one side, making it less susceptible to reflection from the left-side or right-side windows.

DETAILED DESCRIPTION OF THE INVENTION

The detailed description and preferred embodiments of the invention will be set forth in the following content and provided for people skilled in the art to understand the characteristics of the invention.

The light field distribution diagram disclosed in the present invention is obtained by observing the brightness level of the 360-degree direction of the light-emitting surface (perpendicular to the light-emitting plane) from the normal direction of the backlight module. Therefore, the light field distribution diagram is a circle, and the scale around the circle is an angle. The scales marked on each concentric circle inside represent the tilt angle between the viewing direction and the normal direction of the backlight module.

Secondly, the words "approximately", "approximately", "approximately" or "substantially" appearing in the content of this case not only cover the clearly stated numerical values and numerical ranges, but also covers the allowable deviation range that can be understood by a person with ordinary knowledge in the technical field to which the invention belongs. The deviation range can be determined by the error generated during measurement, and this error is caused, for example, by limitations of the measurement system or process conditions. In addition, "about" may mean within one or more standard deviations of the above numerical value, such as within ±5%, ±3%, or ±1%. Words such as "about", "approximately", "approximately" or "substantially" appearing in this text may be used to select acceptable deviation ranges or standard deviations based on optical properties, etching properties, mechanical properties, or other properties. Therefore, a single standard deviation is not applied to all the above optical properties, etching properties, mechanical properties, and other properties.

Figure 1:
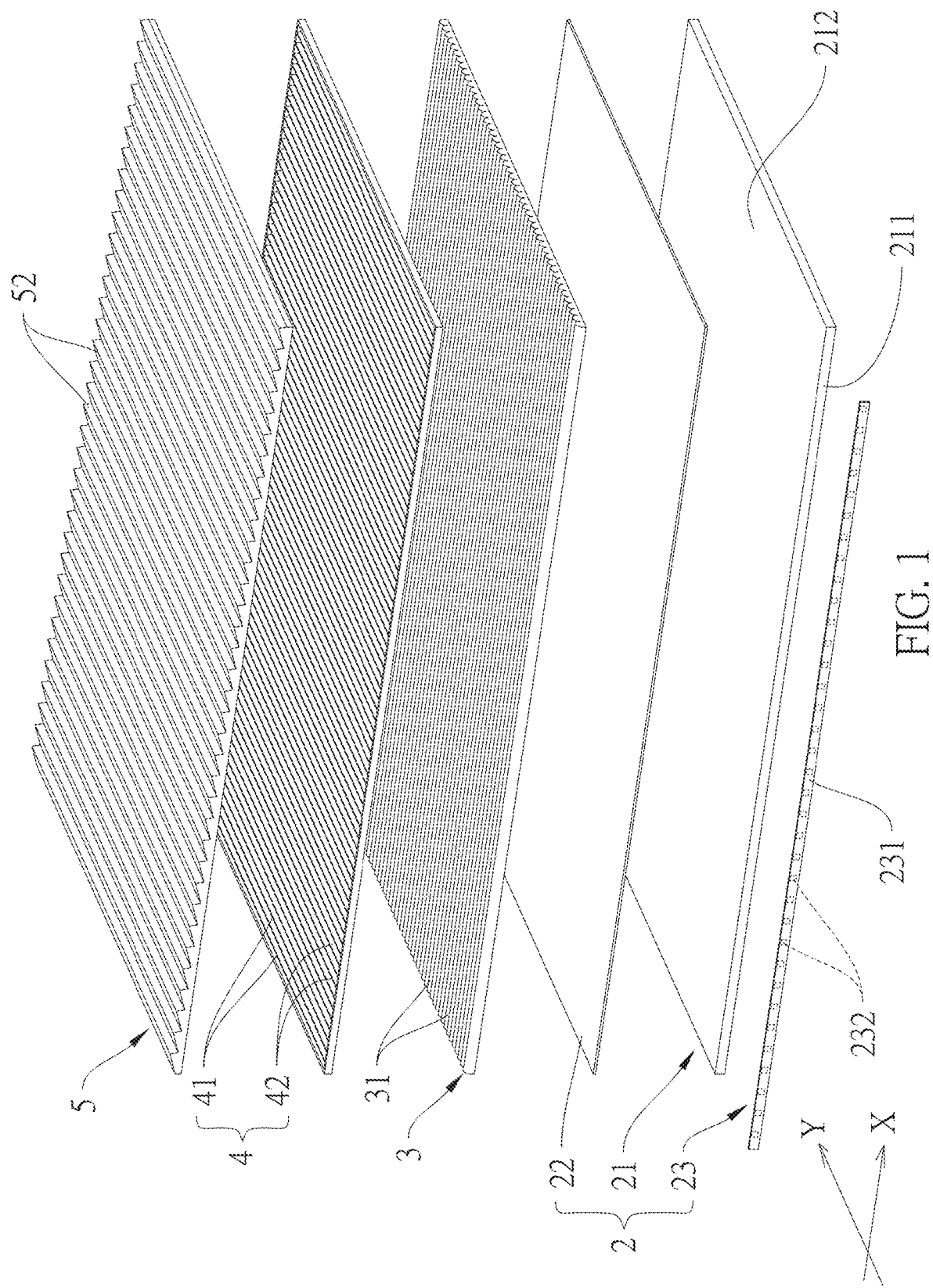
FIG. 1 is a three-dimensional exploded diagram illustrating a first preferred embodiment of the backlight module of this present invention, wherein a light source is a side-lit light source.
Figure 2:
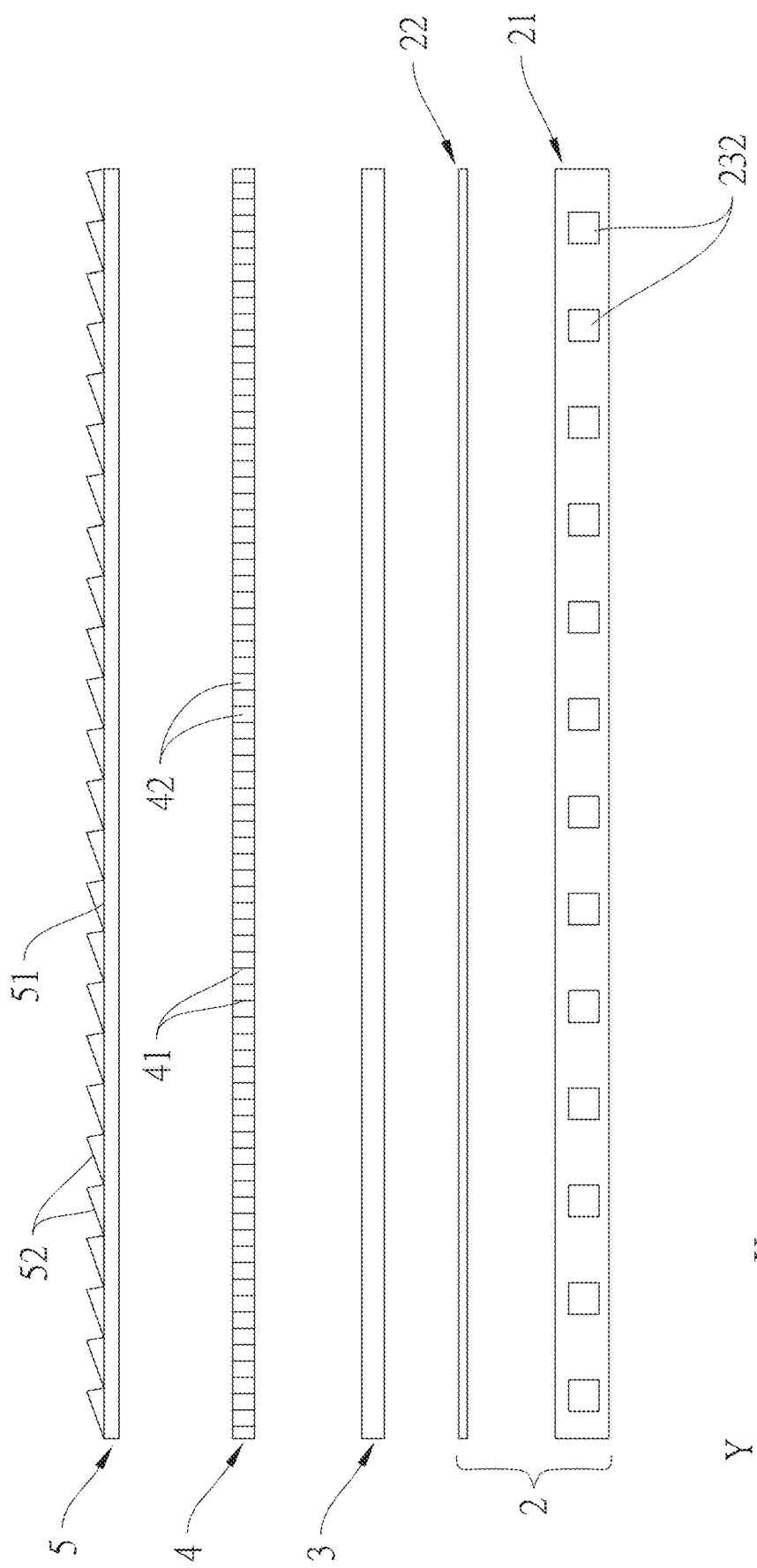
FIG. 2 is side-view diagram illustrating another angle of FIG. 1.

Referring to FIG. 1 and FIG. 2, it is a first preferred embodiment of the backlight module of the present invention. The backlight module comprises a surface light source 2, a prism 3, an optical film 4, and a light control film 5. A display panel (not shown) is provided in the light emitting direction of the light control film 5 to form a display device.

The optical film 4 is defined to have a first direction X, and a second direction Y that is not parallel to the first direction X. In this embodiment, the second direction Y is perpendicular to the first direction. X, but it is not limited to this. In this embodiment, the optical film 4 is a louver film and has a plurality of blocking sections 41 spaced apart along the first direction X, and a plurality of light-transmitting sections 42 located between adjacent blocking sections 41. The blocking sections 41 and the light-transmitting sections 42 extend along the second direction Y. In other embodiments, the optical film 4 may be a light-transmitting film having a prism structure or a light splitting structure instead of a louver film, so the description of this embodiment should not be limited.

Figure 3:
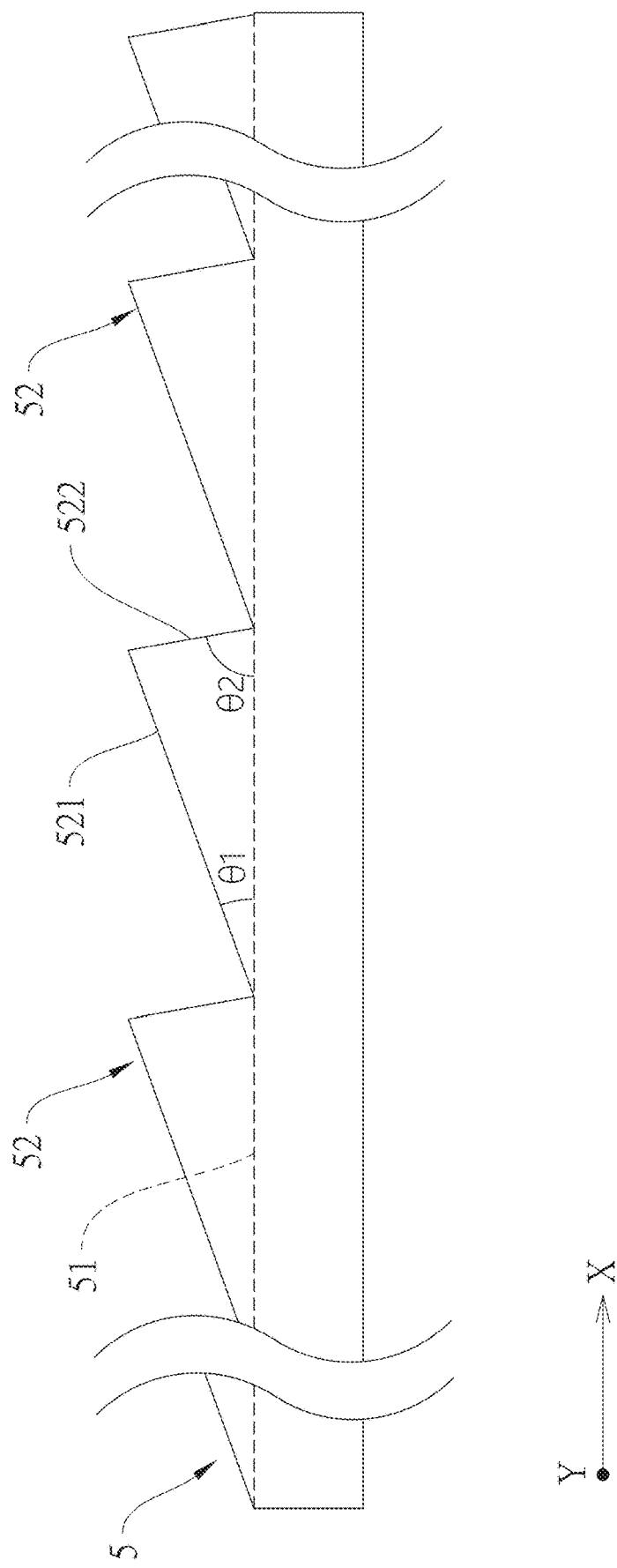
FIG. 3 is a partial enlarged diagram illustrating the structure of a light control film of the first embodiment.

Referring to FIG. 2 and FIG. 3, the light control film 5 has a first reference surface 51 facing away from the optical film 4, and a plurality of first optical structures 52 disposed on the first reference surface 51 along the first direction X. Each of the first optical structures 52 extends along the second direction Y. That is to say, the blocking sections 41 and the light-transmitting sections 42 of the optical film 4 are arranged parallel to the first optical structures 52 of the light control film 5. Each of the first optical structures 52 has a first optical surface 521 and a second optical surface 522. In this embodiment, the first optical surface 521, the second optical surface 522, and the first reference surface 51 together form a triangle, so that each first optical structure 52 has a triangular cross-section. However, in other embodiments, one or both of the first optical surface 521 and the second optical surface 522 can be designed as a compound slope and without causing each first optical structure 52 to have a triangular cross-section. It should not be limited to the description of this embodiment. As shown in FIG. 3, the first optical surface 521 and the second optical surface 522 are arranged along the first direction X. The first optical surface 521 and the first reference surface 51 form a first included angle θ1, and the second optical surface 522 and the first reference surface 51 form a second included angle θ2. The first included angle θ1 is an acute angle, and the first included angle θ1 is smaller than the second included angle θ2. In the first preferred embodiment of the present invention, the first included angle θ1 is 20°, and the second included angle θ2 is 80°. Therefore, each first optical structure 52 has a triangular cross-section in which the first included angle θ1 and the second included angle θ2 are angularly asymmetric.

The optical film 4 disclosed in this embodiment is used to change the light field distribution of the surface light source 2 to a single direction first. Then, the first optical structure 52 of the light control film 5 extending in the same direction as the blocking portion 41 of the optical film 4 is used to adjust the light field distribution that has become a single direction. Since each of the first optical structures 52 of the light control film 5 is an angularly asymmetric microstructure in which the first included angle θ1 is smaller than the second included angle θ2, therefore, when light passes through the light control film 5, its angularly asymmetric microstructure will effectively deflect and guide the light to a specific side for light extraction, while effectively suppressing the light extraction efficiency on the other side. As a result, when applied to displays such as the Driver Information Display (DID) or Co-Driver Display (CDD) positioned in front of the driver's or co-driver's seat, the light distribution can be biased to one side, making it less susceptible to reflection from the left-side or right-side windows.

Figure 4:
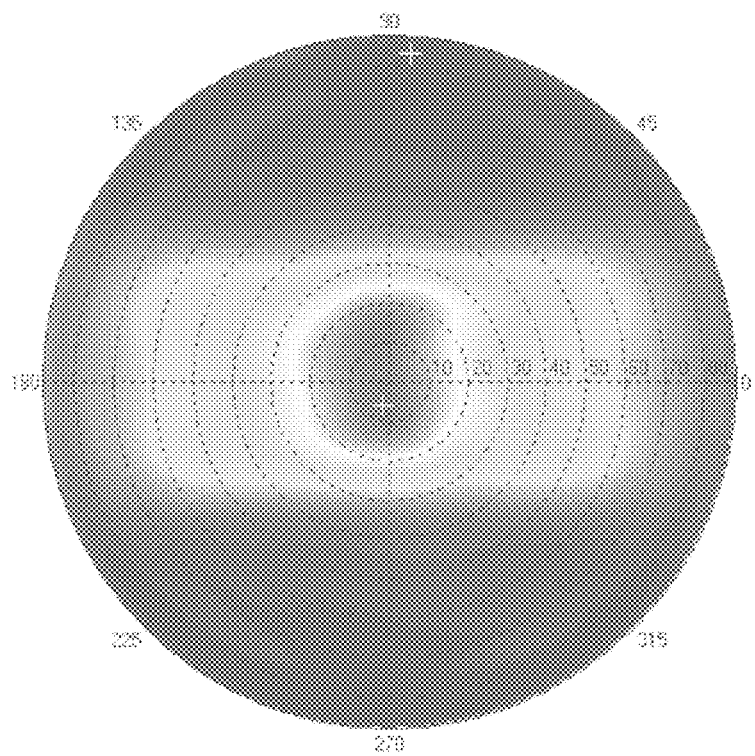
FIG. 4 is a light field distribution diagram illustrating the light field distribution without using the light control film of the present invention.
Figure 5:
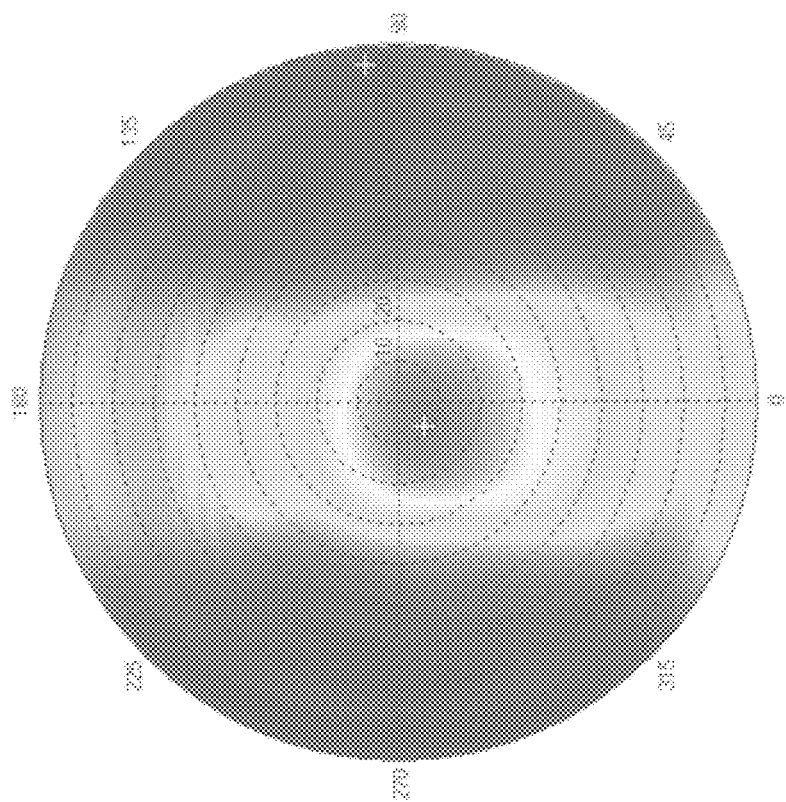
FIG. 5 is a light field distribution diagram illustrating the light field distribution when the microstructure of the light control film and the microstructure of an optical film are perpendicular to each other.
Figure 6:
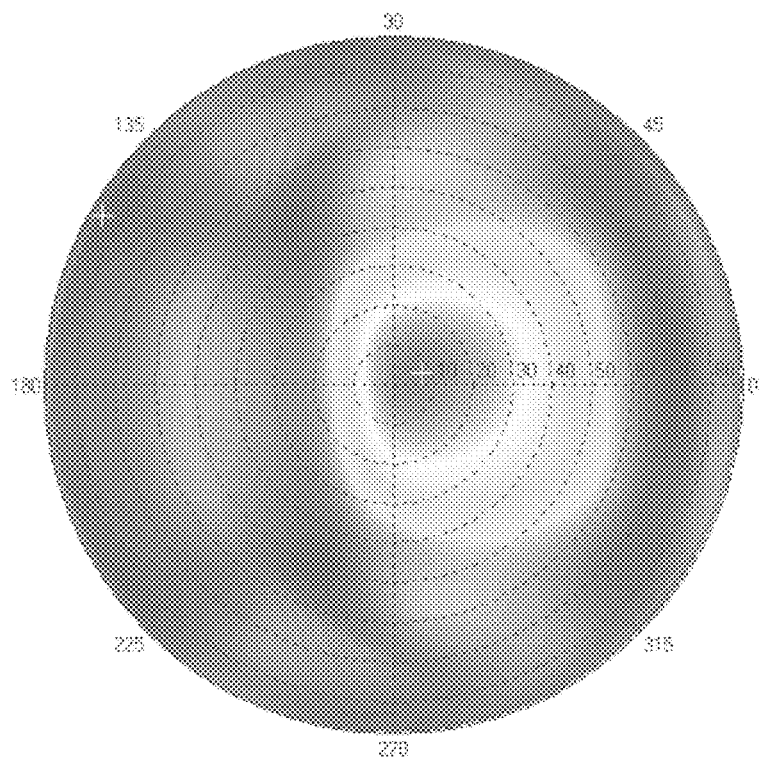
FIG. 6 is a light field distribution diagram illustrating the light field distribution in which the microstructure of the light control film and the microstructure of the optical film are parallel to each other, and the microstructure of the prism and the microstructure of the light control film are perpendicular to each other.

As shown in FIG. 4, it is a light field distribution diagram without using the light control film 5 of the present invention. The dark area is in the center and does not produce any offset effect. In addition, as shown in FIG. 5, even if the light control film 5 of the present invention is used, the extension direction of the first optical structure 52 of the light control film 5 and the extension direction of the blocking portion 41 and the light-transmitting portion 42 of the optical film 4 are perpendicular to each other, and the offset effect is still unable to be produced, and a large amount of noise will be generated on both sides. Therefore, as shown in FIG. 1, the present invention must use the light control film 5 and the optical film 4 at the same time, and the extension direction of the first optical structure 52 of the light control film 5 and the extension direction of the blocking portion 41 and the light-transmitting portion 42 of the optical film 4 must be parallel to each other. In this way, as shown in FIG. 6, the dark area can be deviated from the center, producing the required offset effect.

Figure 8:
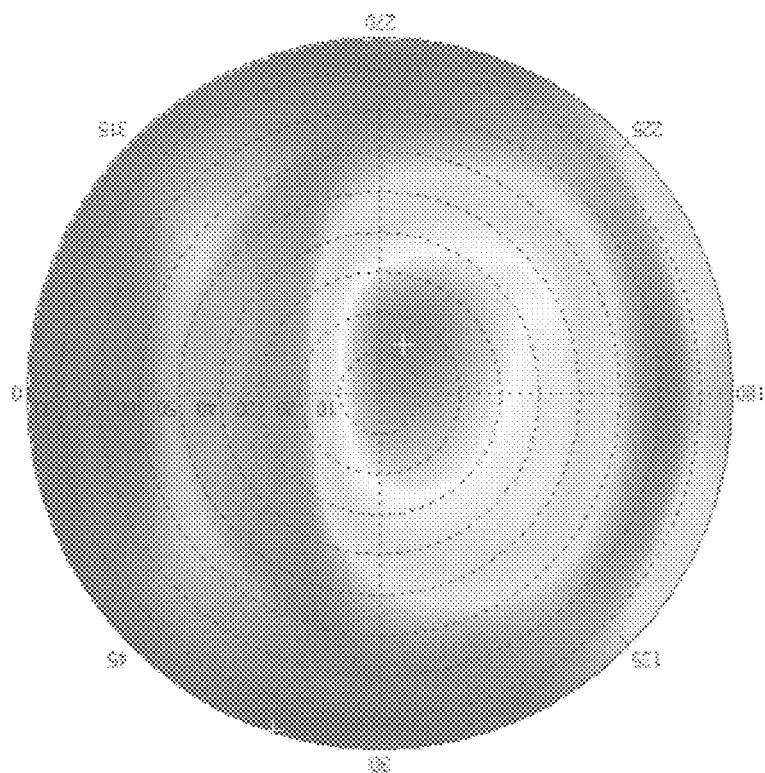
FIG. 8 is a light field distribution diagram illustrating the light field distribution formed by the structure of FIG. 7.
Figure 7:
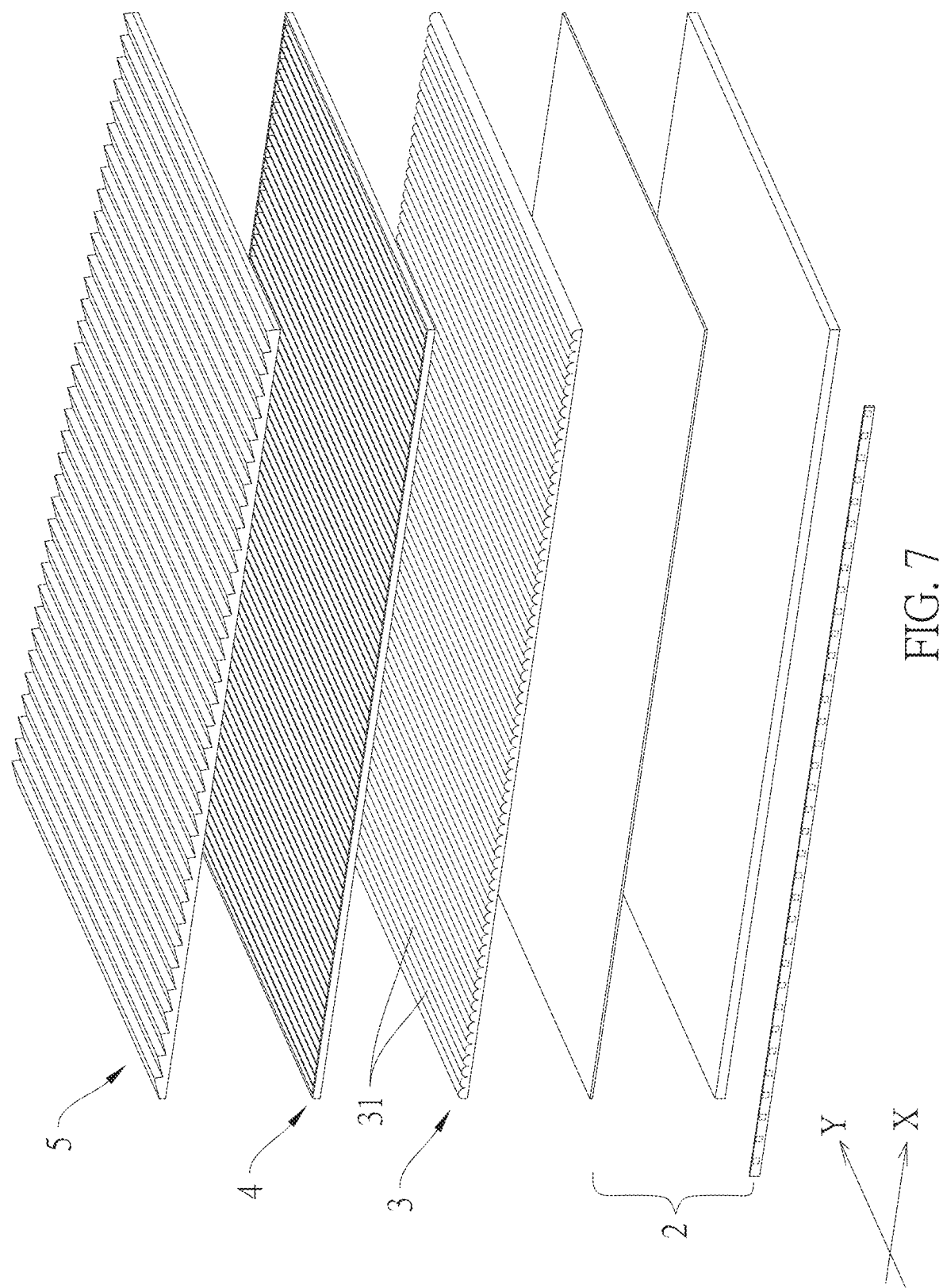
FIG. 7 is a three-dimensional exploded diagram illustrating the microstructure of the light control film, the microstructure of the optical film, and the microstructure of the prism are parallel to each other.

It should be noted that, the prism 3 is between the surface light source 2 and the optical film 4 to assist in converging the light field distribution of the surface light source 2, so that the light can enter the optical film 4 above the prism 3 in a more concentrated manner to avoid loss of light energy or brightness. In addition, the prism 3 has a plurality of strip-shaped or linear microstructures 31, and the strip-shaped microstructures 31 may extend along the first direction X as shown in FIG. 1. The corresponding light field distribution is shown in FIG. 6, which can produce a good offset effect. The strip-shaped microstructure 31 may also extend along the second direction Y as shown in FIG. 7, and its corresponding light field distribution is shown in FIG. 8, which can also produce a good offset effect. Comparing FIG. 6 and FIG. 8, the extension direction of the strip-shaped microstructures 31 of the prism 3 will not affect the offset effect.

Figure 9:
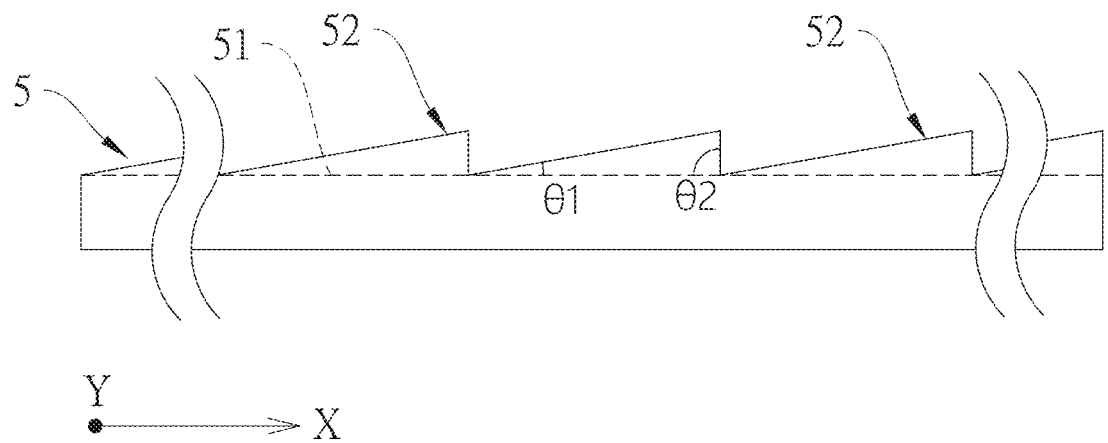
FIG. 9 is a partially enlarged diagram illustrating the partial structure of the light control film in the second preferred embodiment of the backlight module of this present invention.
Figure 10:
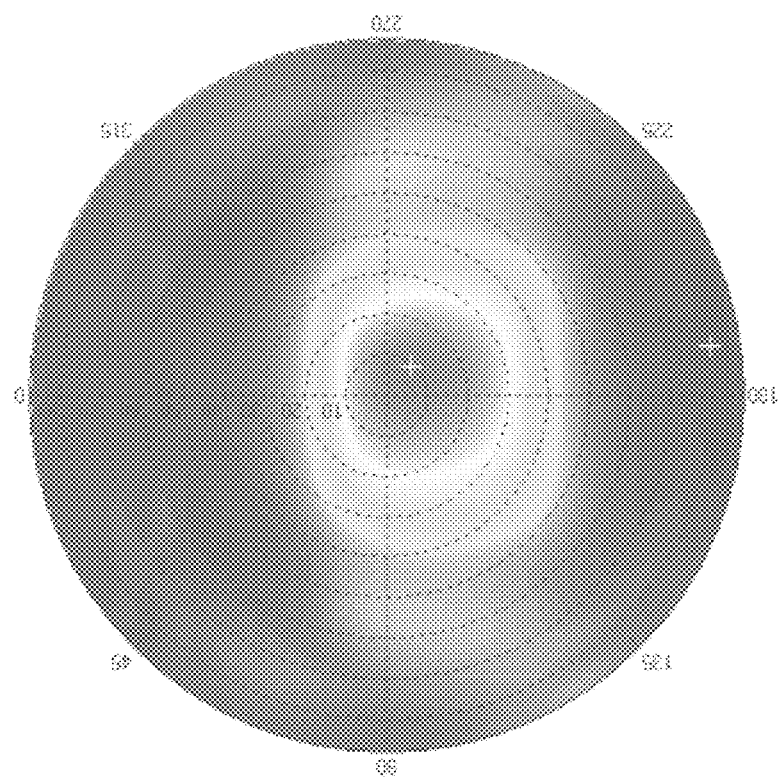
FIG. 10 is a light field distribution diagram illustrating the light field distribution formed by the structure of FIG. 9.

Referring to FIG. 9, which is a second preferred embodiment of the backlight module of the present invention. The difference from the first preferred embodiment is that the first included angle of the light control film 5 is less than 45 degrees, and the second included angle is a right angle. In FIG. 9, the first included angle θ1 is 10°, and the second included angle θ2 is 90°, so that each of the first optical structures 52 has a right-angled triangle cross-section. However, the second included angle θ2 can also be an acute angle to improve the problem of difficulty in mold release at right angles. The light field distribution diagram in FIG. 10 shows that offset effects can also be produced. Compared with FIG. 6, FIG. 10 shows that there are significantly fewer light-colored striped areas on the left, which means that energy or brightness loss can be effectively reduced and resulting in better offset effects.

Referring to FIG. 1 and FIG. 2, in the first preferred embodiment, the surface light source 2 is side-lit and includes a light guide plate 21, a diffusion film 22, and a light bar 23. The light guide plate 21 has a light incident side 211 and a light exit side 212 connected to the light incident side 211. The diffusion film 22 is disposed on the light exit side 212 of the light guide plate 21. The light bar 23 is disposed on the light incident side 211 of the light guide plate 21, and the light exit side 212 faces the optical film 4. The light bar 23 has a circuit board 231 (not shown in FIG. 2) and a plurality of light-emitting elements 232. The circuit board 231 extends along the first direction X, and the light-emitting elements 232 are arranged along the first direction X. Therefore, the arrangement directions of the circuit board 231 and the light-emitting elements 232 are different from the extending directions of the blocking portion 41 of the optical film 4 and the first optical structure 52 of the light control film 5. In this embodiment, they are perpendicular to each other. In this way, the light can be effectively deflected and guided to a specific side, while effectively suppressing the light efficiency on the other side. On the contrary, if the arrangement direction of the circuit board 231 and the light-emitting elements 232 is the same as the direction of the blocking sections 41 of the optical film 4 and the first optical structures 52 of the light control film 5, the light emission on the other side cannot be suppressed.

Figure 11:
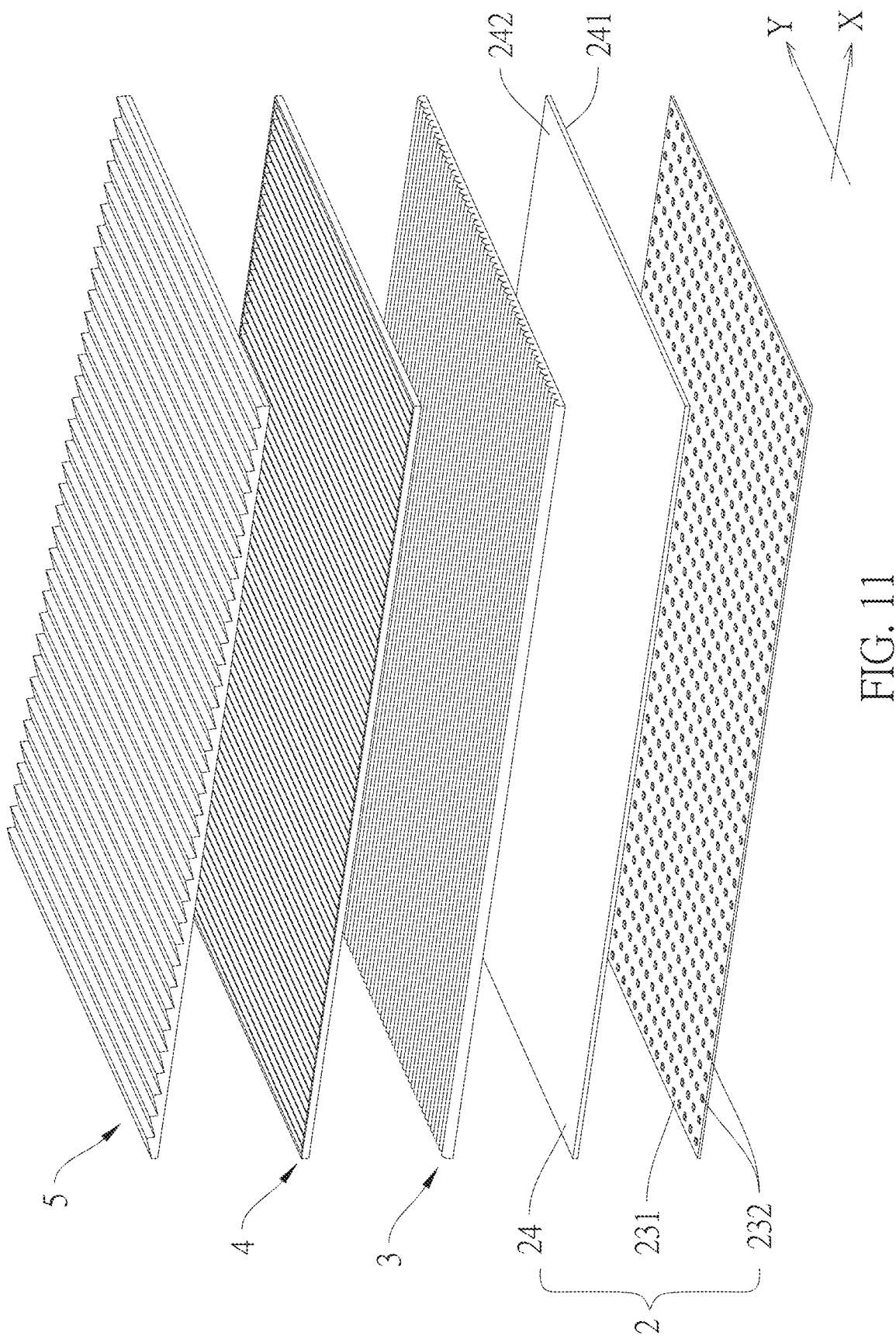
FIG. 11 is a three-dimensional exploded diagram illustrating another form of the first preferred embodiment, wherein a light source is a direct-lit light source.

Furthermore, the surface light source 2 can also be a direct lit as shown in FIG. 11, including a circuit board 231 parallel to the optical film 4, a plurality of light emitting elements 232 arranged on the circuit board 231, and a diffuser plate 24. The diffuser plate 24 has a bottom surface 241 and a top surface 242 opposite to the bottom surface 241. The bottom surface 241 faces the circuit board 231, and the top surface 242 faces the optical film 4. In the present invention, the surface light source 2 can be either side-lit or direct-lit.

Figure 12:
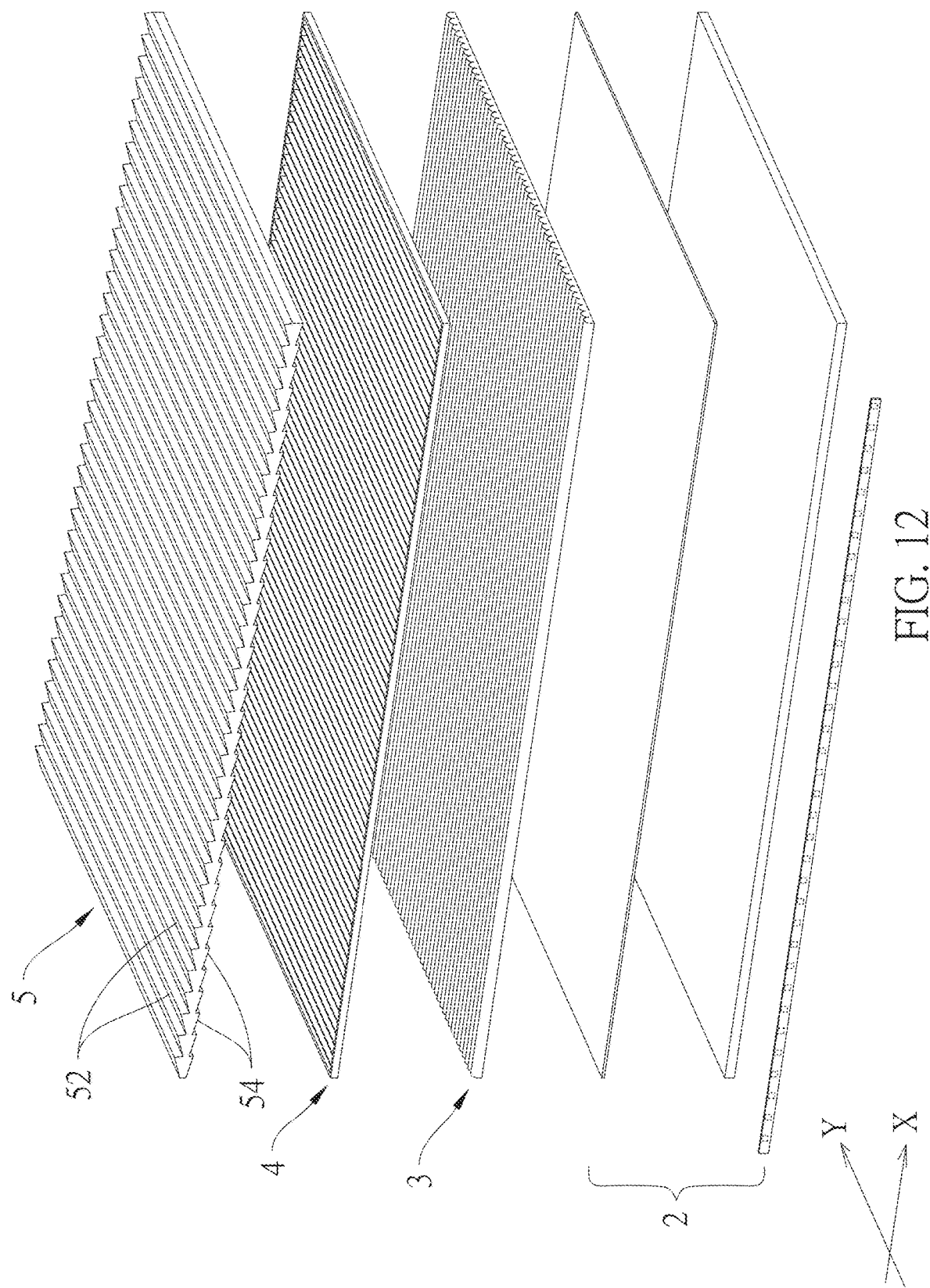
FIG. 12 is a three-dimensional exploded diagram illustrating a third preferred embodiment of the backlight module of this present invention.

Referring to FIG. 12, a third preferred embodiment of the backlight module of the present invention. The backlight module comprises a light source 2, a prism 3, an optical film 4, and a light control film 5. The difference from the first preferred embodiment is that the light control film 5 further comprises a plurality of optical structures 54 facing the optical film 4 and disposed along the first direction X. The first optical structures 52 and the second optical structures 54 extend along the second direction Y.

Figure 13:
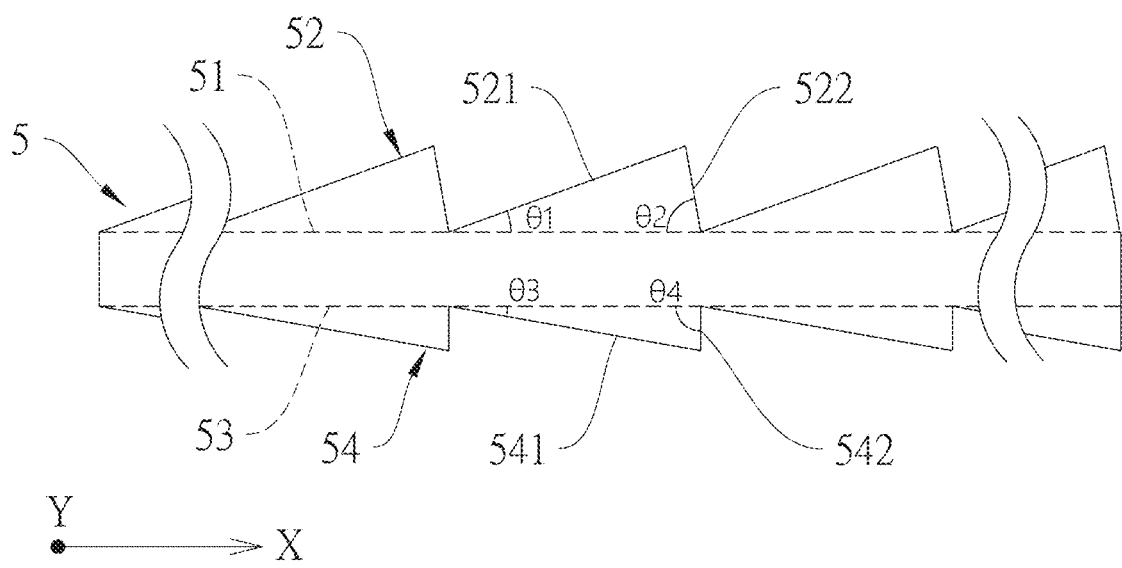
FIG. 13 is a partially enlarged diagram illustrating the partial structure of the light control film in the third preferred embodiment of the backlight module of this present invention.
Figure 14:
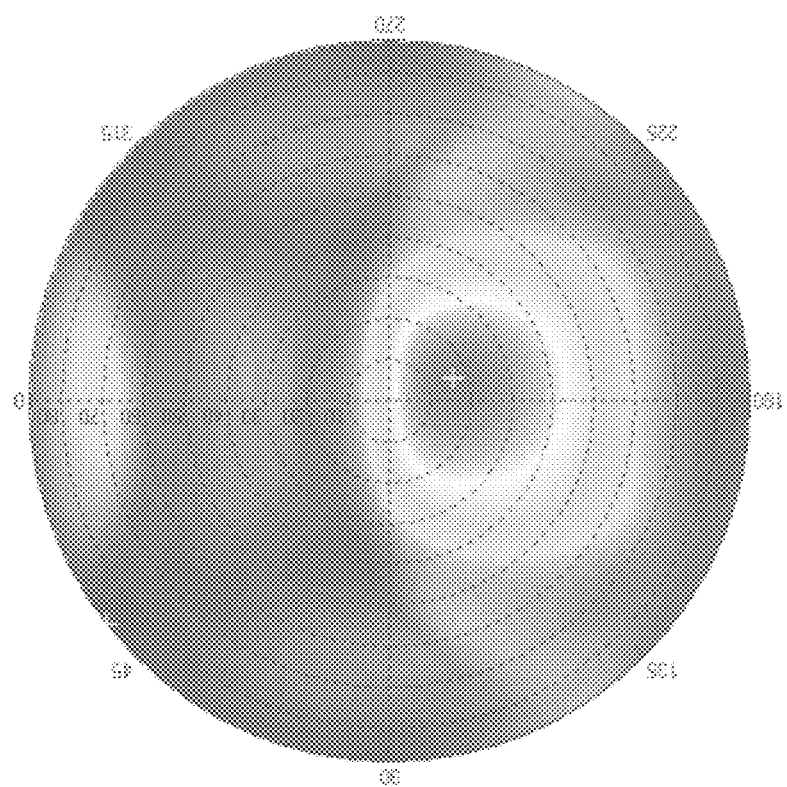
FIG. 14 is a light field distribution diagram illustrating the light field distribution formed by the structure of FIG. 13.

Referring to FIG. 13, in more detail, the light control film 5 further comprises a second reference surface 53 relative to the first reference surface 51 and facing the optical film 4. The second optical structures 54 are disposed on the second reference surface 53 along the first direction X. Each of the first optical structures 52 has a first optical surface 521 and a second optical surface 522. The first optical surface 521 and the first reference surface 51 have a first included angle θ1, and the second optical surface 522 and the first reference surface 51 have a second included angle θ2. The first included angle θ1 is an acute angle, and the first included angle θ1 is smaller than the second included angle θ2. Each of the second optical structures 54 has a third optical surface 541 and a fourth optical surface 542. The third optical surface 541 and the second reference surface 53 form a third included angle θ3, and the fourth optical surface 542 and the second reference surface 53 form a fourth included angle θ4. The third included angle θ3 is an acute angle, and the third included angle θ3 is smaller than the fourth included angle θ4. The first included angle θ1 of the first optical structures 52 and the third included angle θ3 of the second optical structures 54 are toward the same side of the light control film 5. The first included angle θ1 and the third included angle θ3 are both less than 45 degrees, and the second included angle θ2 and the fourth included angle θ4 are both greater than 45 degrees. The first included angle θ1 is greater than the third included angle θ3, the fourth included angle θ4 is greater than the second included angle θ2, and the fourth included angle θ4 is a right angle. In this embodiment, the first included angle θ1 is 20°, the second included angle θ2 is 80°, the third included angle θ3 is 10°, and the fourth included angle θ4 is 90°. The light field distribution diagram in FIG. 14 can also produce a offset effect, and compared with FIG. 6, the dark area in FIG. 14 is further away from the center, resulting in more obvious offset effect. In short, compared with the first optical structures 52 being provided on only one side of the light control film 5, this embodiment uses the light control film 5 with the second optical structures 54 on the second reference surface 53, the light field deflection effect can finely adjust to meet different usage situations or customer requirements. In addition, the first optical structures 52 and the second optical structures 54 are convex structures. In other embodiments, concave structures can also be used, and their light field deflection effects are still basically the same or similar. Therefore, it should not be limited to the description of this embodiment.

Figure 15:
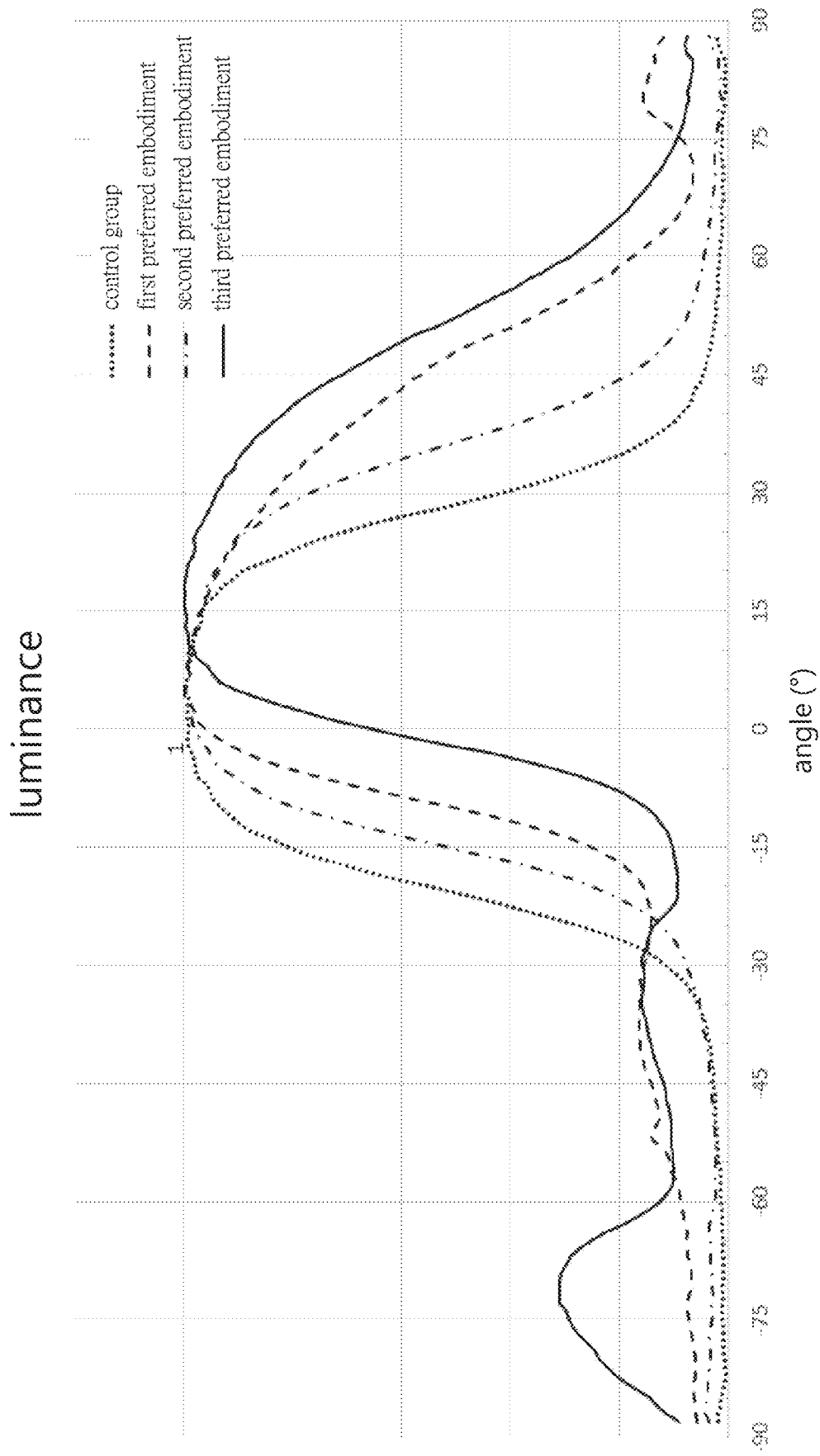
FIG. 15 is a graph that quantifies the light field distribution values of various embodiments.

Referring to FIG. 15, it is a graph that quantifies the light field distribution values of various embodiments. Wherein, the dotted line represents the control group using only the optical film 4. The dashed line represents the first preferred embodiment. The dash-dotted line represents the second preferred embodiment. The solid line represents the third preferred embodiment. FIG. 15 shows that compared with the control group, the third preferred embodiment can most effectively suppress the light output at the viewing angle of −30° to −15° and shift the light output to the viewing angle of 15° to 30°, which can effectively suppress the light extraction of one side and produce an offset effect. It should be noted that each included angle of the light control film 5 can be adjusted to adjust the light deflection range according to different application environments to obtain the best offset effect.

Figure 16:
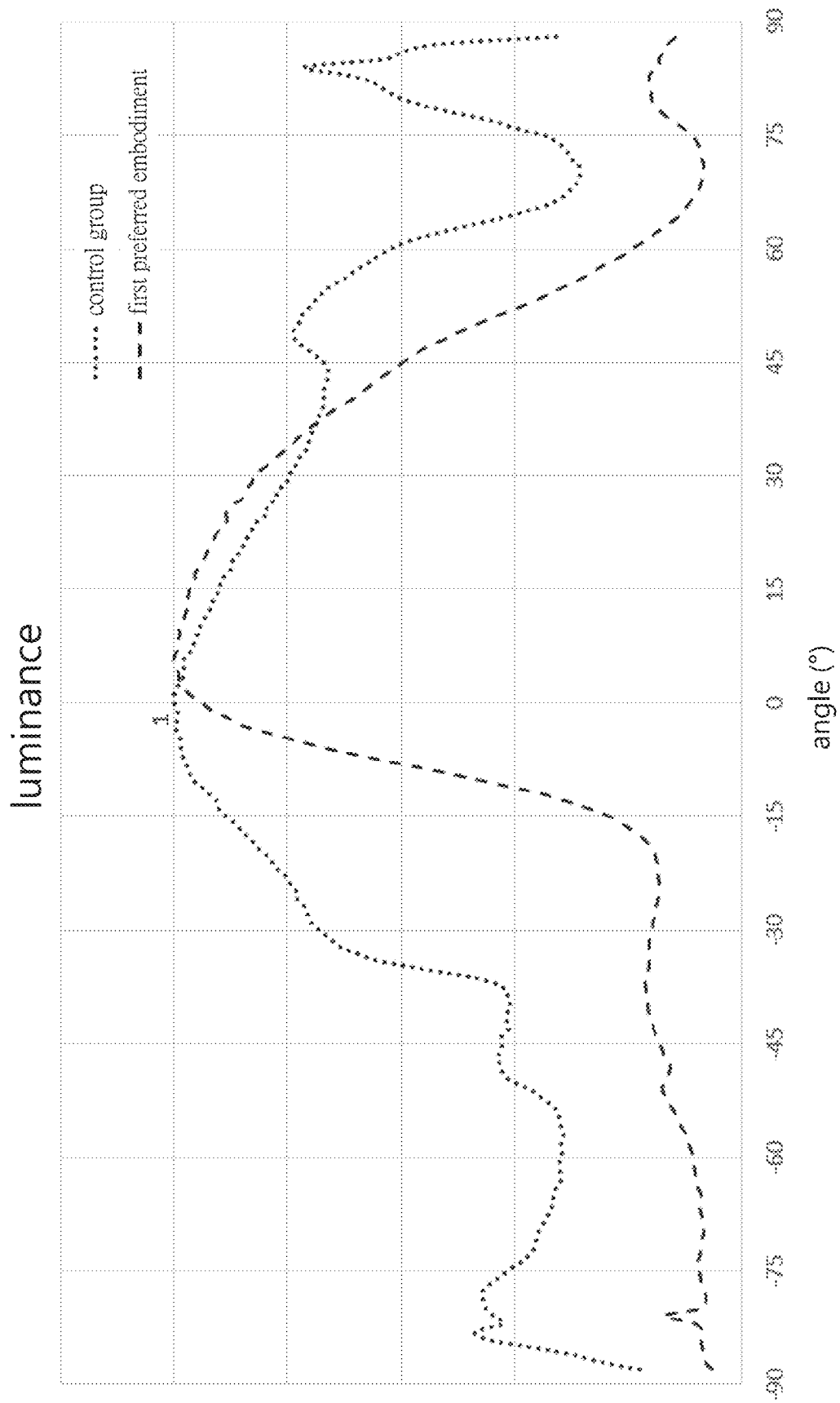
FIG. 16 is a graph illustrating the numerical difference in light field distribution between using the light control film alone and using the light control film in conjunction with the optical film.

In the first preferred embodiment of the backlight module of the present invention, the light control film 5 is arranged so that after the light passes through and leaves the light control film 5, it is deflected in a direction away from the first optical surface 521. In this way, the light is deflected to one side and the light emission of the other side is suppressed, so it can be applied to the environments that require asymmetric light fields. However, if there is only the light control film 5 but not the optical film 4, there will still be significant stray light in the viewing angle distribution in the horizontal between ±60 and ±90 degrees, as shown in FIG. 16. In order to eliminate large-angle stay light caused by total reflection, the first preferred embodiment of the backlight module of the present invention also needs to dispose the optical film 4 between the light control film 5 and the surface light source 2. In this way, the light that is prone to total reflection in the light control film 5 (that is, the light with an incident angle greater than the critical angle θc of the light control film 5) is eliminated (or cut-off) before entering the light control film 5. In FIG. 16, the dotted line represents the control group using only the light control film 5. The dashed line represents the first preferred embodiment. As shown in FIG. 16, only when the light control film 5 and the optical film 4 are combined, the light can be deflected to one side and the light emission from the other side can be suppressed. At the same time, it can also avoid the generation of stray light at large angles and significantly reduce the light energy or luminance in the viewing angle area between ±60 and ±90 degrees.

In more detail, the light emission angle δ of the optical film 4, the first included angle θ1 of the light control film 5, and the critical angle θc of the light control film 5 must comply with the following relationship: δ+θ1<θc.

Figure 17:
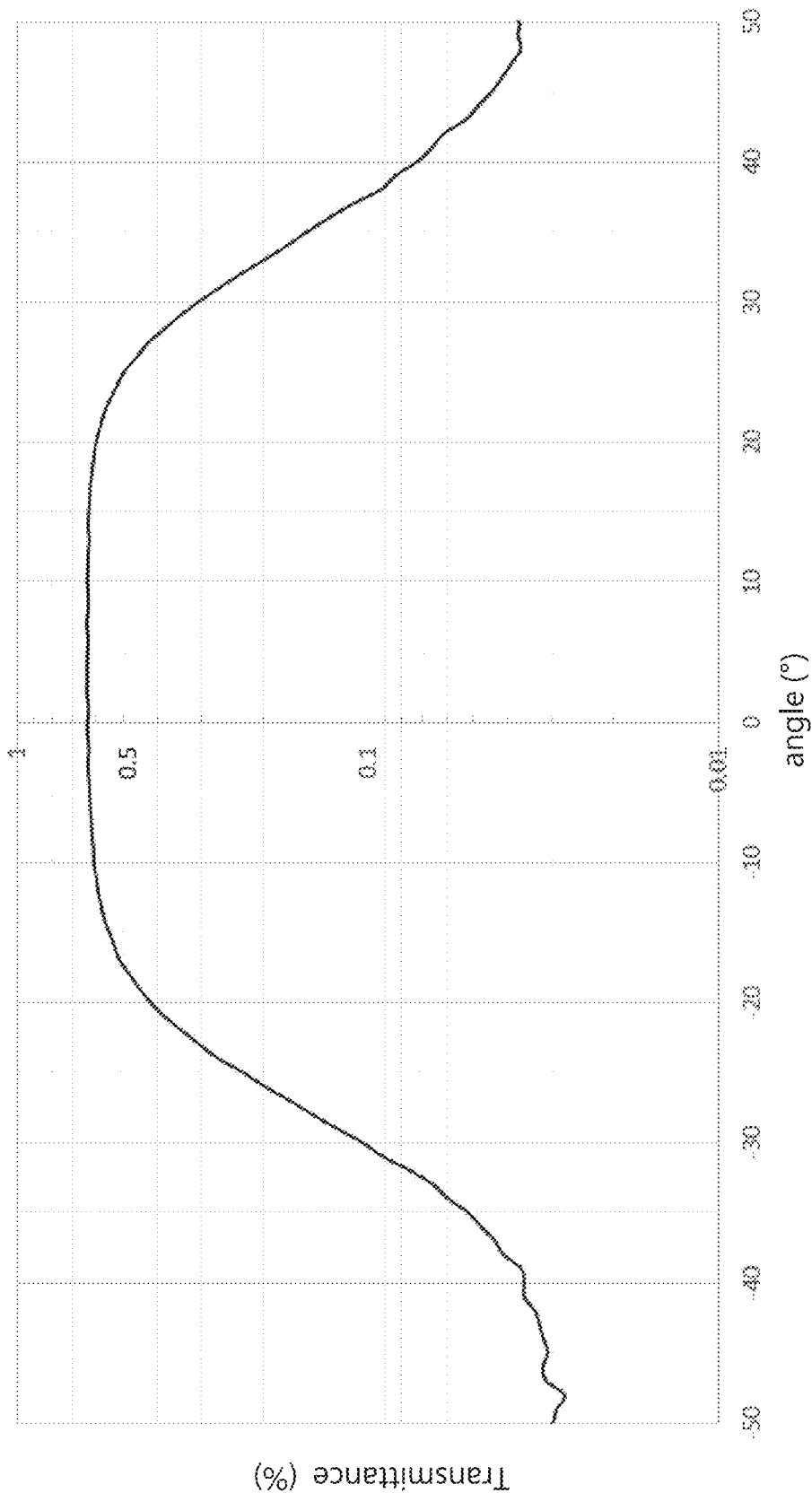
FIG. 17 is a graph illustrating the light transmittance by using this optical film.

Referring to FIG. 17, when the light emitted by the surface light source 2 passes through the optical film 4, the light emission angle δ is an angle range relative to the normal direction of the backlight module, and the transmittance is at least 50%. That is, the viewing angle is between approximately −17° to −18° and +24° to +25°. In order to deflect the viewing angle light at negative angles, the value of δ is designed to be 17 in this embodiment. The light control film 5 is made of polycarbonate (PC), and its critical angle θc is 39°. Therefore, the first included angle θ1 of the light control film 5 is designed to be less than 22° to comply with the relationship of δ+θ1<θc. In the first preferred embodiment of the present invention, the first included angle θ1 is 20°, which is less than 22°. In addition, although the light control film 5 in this embodiment is made of PC, it can also be made of Optically Clear Adhesives (OCA), Polyethylene terephthalate (PET), Poly methyl methacrylate (PMMA). Therefore, the critical angle θc will be different and should not be limited to the description of this embodiment.

Figure 18:
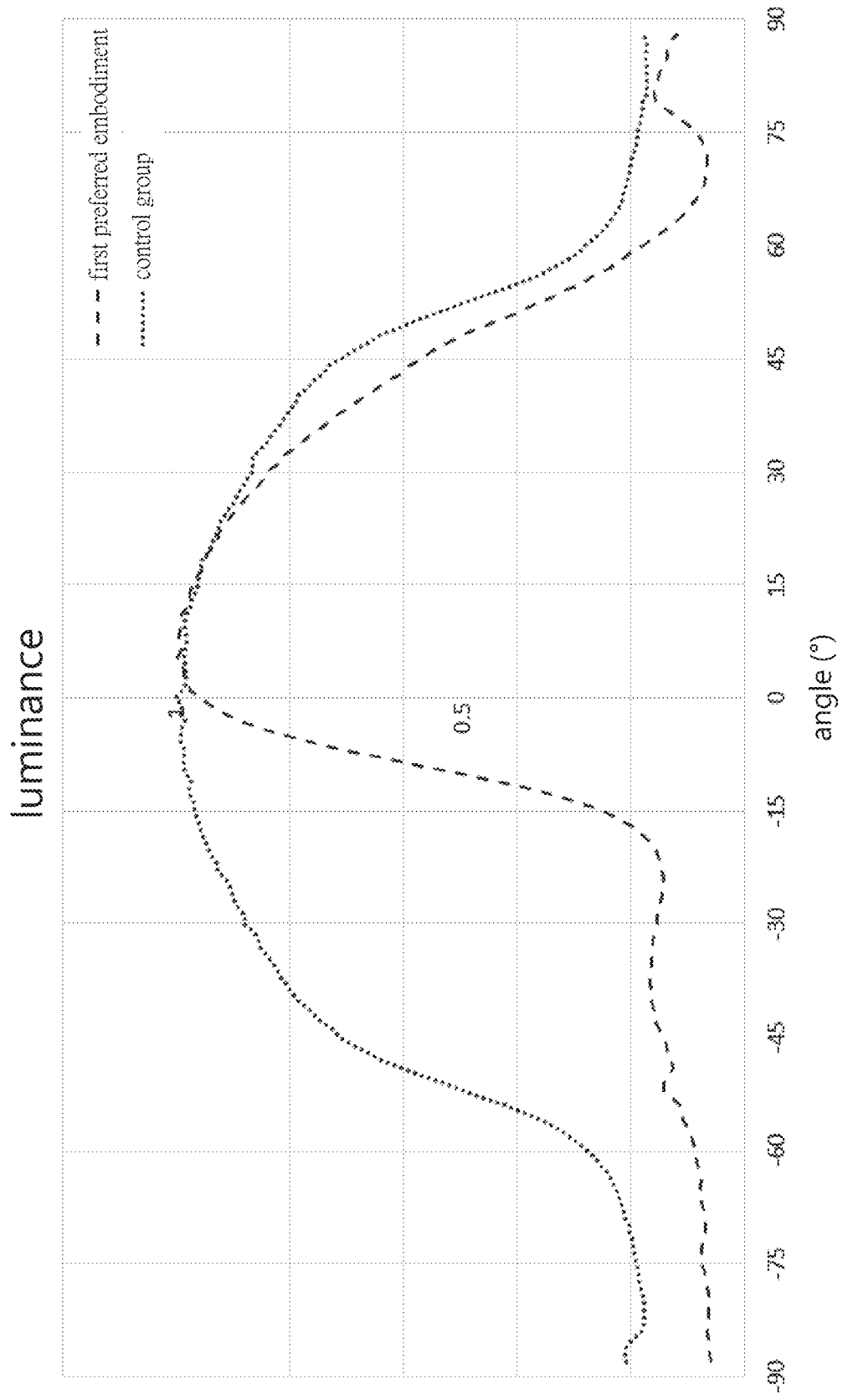
FIG. 18 is a graph illustrating the numerical difference in light field distribution between using the light control film alone and using the light control film in conjunction with the optical film.

Referring to FIG. 18, the dotted line represents the control group using only the optical film 4. The dashed line represents the first preferred embodiment. In this embodiment, when the light leaves the light control film 5, it is directed away from the first optical surface 521 by a deflection angle μ. The angle μ conforms to the following relationship: μ=0.52*θ1+29.7. When the first included angle θ1 is 20°, the deflection angle μ is approximately 40° (0.52*20°+29.7=40.1°). That is to say, when the light control film 5 and the optical film 4 are not combined, the light emitting position of 50% of the light energy or luminance corresponds to a viewing angle of approximately −52° (the dotted line). Compared with the case where the light control film 5 and the optical film 4 are combined, the light emitting position of 50% of the light energy or luminance corresponds to a viewing angle of approximately −10° (the dashed line), and the difference between the two is 42°, which is quite close to the above calculation result of the formula. In other embodiments, when the first included angle θ1 is 10°, the deflection angle μ is approximately) 35° (0.52*10°+29.7=34.9°. When the first included angle θ1 is 40°, the deflection angle μ is approximately 50° (0.52*) 40°+29.7=50.5°. In other embodiments, when the first included angle θ1 is 10°, the deflection angle μ is approximately 35° (0.52*10°+29.7=34.9°). When the first included angle θ1 is 40°, the deflection angle μ is approximately 50° (0.52*) 40°+29.7=50.5°. Therefore, the above formula can effectively represent the relationship between the deflection angle μ and the first included angle θ1.

Figure 19:
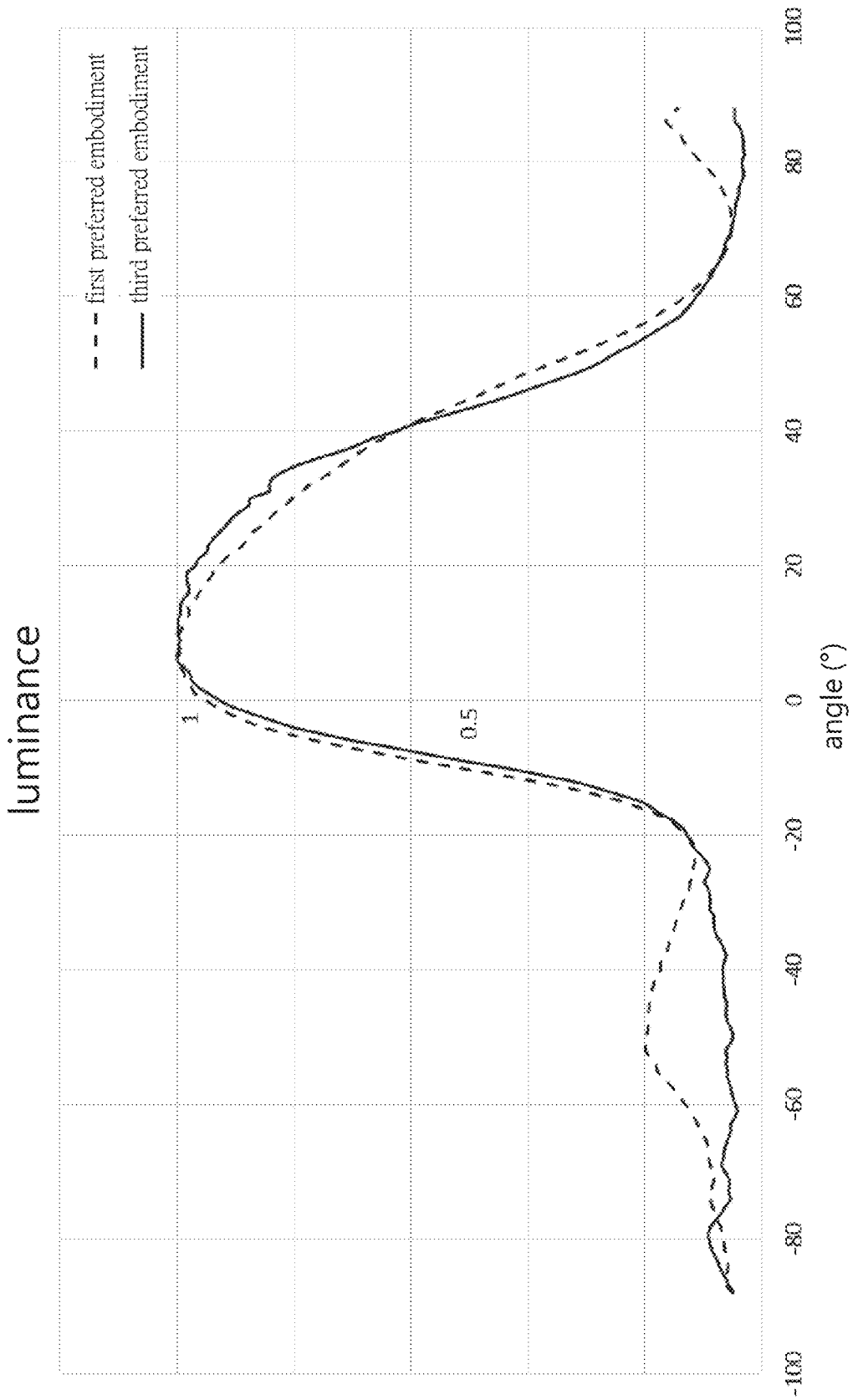
FIG. 19 is a graph illustrating the numerical difference in light field distribution between the light control film with a single-sided microstructure and a double-sided microstructure.

When the light control film 5 is adopted as a double-sided microstructure similar to the third preferred embodiment of the backlight module of the present invention, the light emission angle δ of the optical film 4, the first included angle θ1 of the light control film 5, the third included angle θ3, and the critical angle θc of the light control film 5 must meet the following formula: δ+(θ1+θ3)<θc. Referring to FIG. 19, when the light control film 5 with single-sided microstructures and the first internal angle θ1 is 20° (the dashed line), the light emitting position of 50% of the light energy or luminance corresponds to a viewing angle of approximately −10°. When the light control film 5 with double-sided microstructures as the first internal angle θ1 is 10° and the third included angle θ3 is 10° (the solid line), the light emitting position of 50% of the light energy or luminance also corresponds to a viewing angle of approximately −10°. Both the single-sided microstructures of the first preferred embodiment and the double-sided microstructures of the third preferred embodiment can deflect light to one side and suppress the light extraction of the other side. At the same time, they can also avoid large-angle stray light. Wherein, the double-sided microstructures of the third preferred embodiment can further reduce the energy or luminance at viewing angles between −30° to −60° and +70° to +90°.

Figure 21:
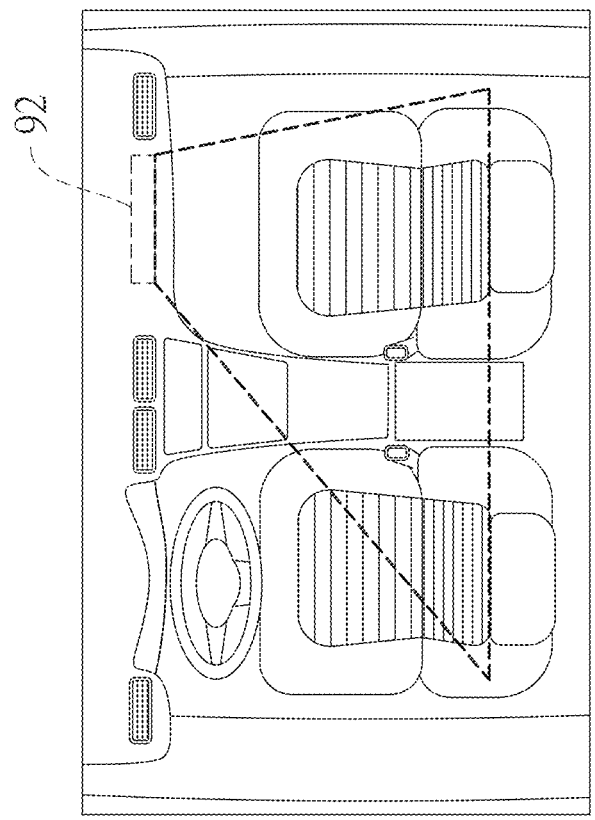
FIG. 21 is a schematic diagram illustrating the light deflection range of the backlight module of the present invention when used in vehicle-mounted equipment, wherein the vehicle-mounted equipment is located on the passenger's seat side.
Figure 20:
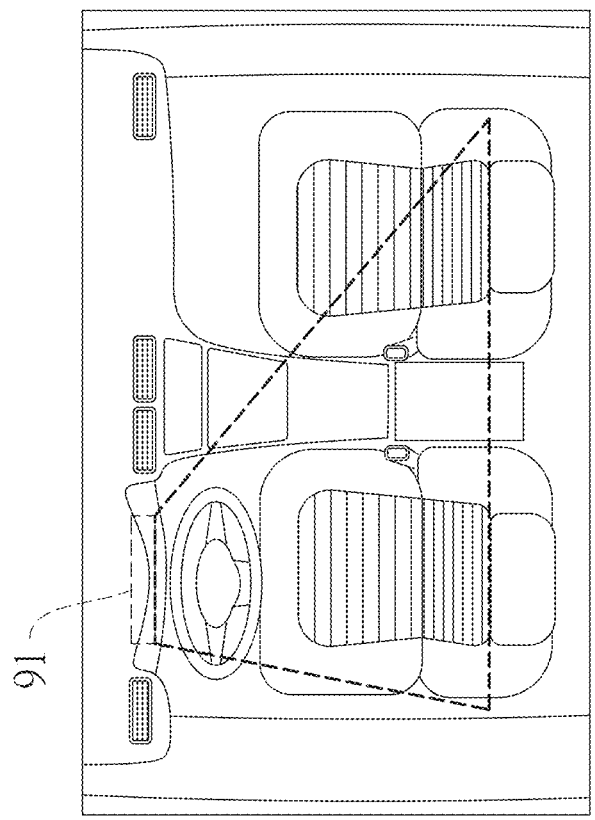
FIG. 20 is a schematic diagram illustrating the light deflection range of the backlight module of the present invention when used in vehicle-mounted equipment, wherein the vehicle-mounted equipment is located on the driver's seat side.

Through the above design, when the backlight module of the present invention is used in vehicle-mounted equipment, as shown in FIG. 20, the image of the dashboard 91 located on the driver's seat side can be projected to the driver's seat and passenger seat, and it will not be reflected by the window on the driver's side. Alternatively, as shown in FIG. 21, the image of the display screen 92 located on the passenger's seat side can be projected to the driver's seat and the passenger's seat but will not be reflected by the window on the passenger's side, reducing interference caused by image reflections.

To sum up, the backlight module of the present invention can deflect light to one side and suppress the light emission rate of the other side through the combination of the optical film and the light control film, and it can be applied to environments that require anisotropic light fields.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A backlight module, comprising:
a surface light source;
an optical film, installed on an emitting side of the surface light source; and
a light control film, comprising a first reference surface and multiple first optical structures positioned on the first reference surface, wherein the first reference surface is located on one side of the light control film facing away from the optical film, each of said first optical structures comprises a first optical surface and a second optical surface, wherein the first optical surface and the second optical surface are arranged along a first direction, the first optical surface and the first reference surface form a first included angle θ1, the second optical surface and the first reference surface form a second included angle θ2, the first included angle θ1 is an acute angle, and the first included angle 01 is smaller than the second included angle θ2;
wherein the light control film further comprising a second reference surface relative to the first reference surface and multiple second optical structures arranged along the first direction on the second reference surface, each of the first optical structures extends along a second direction, where the first direction is not parallel to the second direction, each of the second optical structures extends along the second direction, each of the second optical structures consists of a third optical surface and a fourth optical surface, the third optical surface and the second reference surface form a third included angle θ3, the fourth optical surface and the second reference surface form a fourth included angle θ4, and the third included angle θ3 is acute and smaller than the fourth included angle θ4;
wherein the light emitted by the surface light source has an output angle δ relative to the forward direction of the backlight module when passing through the optical film; and
wherein the output angle δ of the optical film, the first included angle θ1 of at least one of said first optical structures, the third included angle θ3 of at least one of said second optical structures, and the critical angle θc of the light control film satisfy the following relationship: $\delta+(\theta 1+\theta 3)<\theta c$.

2. The backlight module as claimed in claim 1, wherein the transmittance of the light of the optical film is at least 50%, and the light emitted by the surface light source enters the light control film and deflects in the direction away from the first optical surface of at least one of said first optical structures after passing through the light control film.

3. The backlight module as claimed in claim 2, wherein the light deflects at an angle μ away from the first optical surface of at least one of said first optical structures when it exits the light control film, and the angle μ is determined by the following relationship: $\mu=0.52*\theta 1+29.7$.

4. The backlight module as claimed in claim 2, wherein the output angle δ of the optical film, the first included angle θ1 of at least one of said first optical structures, and the critical angle θc of the light control film satisfy the following relationship: $\delta+\theta 1<\theta c$.

5. The backlight module as claimed in claim 1, wherein the optical film is a grating film with multiple blocking sections spaced along the first direction and multiple light-transmitting sections located between adjacent blocking sections, each of the first optical structures extends along a second direction, where the first direction is not parallel to the second direction, and the blocking sections and the light-transmitting sections extend along the second direction.

6. The backlight module as claimed in claim 1, wherein the backlight module further includes a prism positioned between the surface light source and the optical film, and the prism has multiple linear microstructures extending along the first direction.

7. The backlight module as claimed in claim 1, wherein the backlight module further includes a prism positioned between the surface light source and the optical film, each of the first optical structures extends along a second direction, where the first direction is not parallel to the second direction, and the prism has multiple linear microstructures extending along the second direction.

8. The backlight module as claimed in claim 1, wherein the first included angle θ1 of at least one of said first optical structures and the third included angle θ3 of at least one of said second optical structures are oriented towards the same side of the light control film, both the first included angle θ1 of at least one of said first optical structures and the third included angle θ3 of at least one of said second optical structures are less than 45 degrees, and both the second included angle θ2 of at least one of said first optical structures and the fourth included angle θ4 of at least one of said second optical structures are greater than 45 degrees.

9. The backlight module as claimed in claim 1, wherein the first included angle θ1 of at least one of said first optical structures is greater than the third included angle θ3 of at least one of said second optical structures.

10. The backlight module as claimed in claim 1, wherein the surface light source comprises a light guide plate and a light bar, the light guide plate has a light incident side and an light exit side connected to the light incident side, the light bar is positioned on the light incident side of the light guide plate, and the light exit side faces the optical film.

11. The backlight module as claimed in claim 10, wherein the light bar comprises of a circuit board and multiple light-emitting elements, the circuit board extends along the first direction, and the light-emitting elements are arranged along the same direction.

12. The backlight module as claimed in claim 1, wherein the surface light source comprises a circuit board parallel to the optical film and multiple light-emitting elements positioned on the circuit board.

13. The backlight module as claimed in claim 12, wherein the surface light source further comprises a diffuser plate, which has a bottom surface and a top surface opposite to the bottom surface, the bottom surface faces the circuit board, and the top surface faces the optical film.

14. A display device, comprising the backlight module as described in claims 1, and a display panel arranged on the backlight module.

\* \* \* \* \*

UNITED STATES PATENT AND TRADEMARK OFFICE
CERTIFICATE OF CORRECTION

| | | |
|---|---|---|
| PATENT NO. | : 12,468,082 B2 | Page 1 of 1 |
| APPLICATION NO. | : 18/927724 | |
| DATED | : November 11, 2025 | |
| INVENTOR(S) | : Wei-Hsuan Chen, Chun-Hau Lai and Wen-Hao Cai | |

It is certified that error appears in the above-identified patent and that said Letters Patent is hereby corrected as shown below:

On the Title Page

Related U.S. Application Data should read:
(63) Continuation of application No. PCT/CN2023/090823, filed on Apr. 26, 2023.

Signed and Sealed this
Thirteenth Day of January, 2026

John A. Squires
*Director of the United States Patent and Trademark Office*